United States Patent [19]

Haber

[11] Patent Number: 5,790,529

[45] Date of Patent: Aug. 4, 1998

[54] COMMUNICATIONS NETWORK NODE WITH SWITCHED CHANNELIZER ARCHITECTURE

[75] Inventor: William Joe Haber, Tempe, Ariz.

[73] Assignee: Motorola, Inc., Schaumburg, Ill.

[21] Appl. No.: 691,086

[22] Filed: Aug. 1, 1996

[51] Int. Cl.$^6$ .................................................. H04B 7/185
[52] U.S. Cl. ........................... 370/536; 370/323; 370/388; 370/328
[58] Field of Search ........................ 370/315, 316, 370/323, 325, 326, 366, 370, 372, 375, 478, 536, 541, 367, 388, 321, 380; 375/211, 219, 260, 295

[56] References Cited

U.S. PATENT DOCUMENTS

| | | |
|---|---|---|
| 4,425,639 | 1/1984 | Acampora et al. .................. 370/323 |
| 4,931,802 | 6/1990 | Assae et al. ........................ 370/323 |
| 5,585,850 | 12/1996 | Schwaller ........................... 348/388 |
| 5,592,480 | 1/1997 | Carney et al. ...................... 370/347 |
| 5,594,939 | 1/1997 | Curello et al. ..................... 375/219 |
| 5,606,575 | 2/1997 | Williams ............................ 375/219 |

*Primary Examiner*—Hassan Kizou
*Assistant Examiner*—Soon-Dong Hyun
*Attorney, Agent, or Firm*—Gregory J. Gorrie

[57] ABSTRACT

A communications network (10) includes nodes (18) in which switched channelizers (32) decompose wideband signals into narrowband signals and route the narrowband signals to specified demodulators (34). The switched channelizers (32) serve as building blocks which may be coupled together in parallel and in series. Switch portions (28) of switched channelizers (32) may couple together so that the switched channelizers (32) form interconnected switched channelizer groups (54). Within an interconnected switched channelizer group (54), any channel from any wideband signal may be routed to any demodulator (34).

15 Claims, 4 Drawing Sheets

3,790,529

1

COMMUNICATIONS NETWORK NODE WITH SWITCHED CHANNELIZER ARCHITECTURE

FIELD OF THE INVENTION

The present invention relates generally to communication networks. More specifically, the present invention relates to networks in which nodes receive numerous individual communication channels conveyed by one or more wideband signals and decompose the wideband signals into constituent channels.

BACKGROUND OF THE INVENTION

In communication networks, and particularly cellular radio telephony networks, any single network node, such as a cellular base station, is often required to process only a fraction of the total channels available to the network. A channel is typically processed by receiving a wideband signal, decomposing the wideband signal into many narrowband signals, demodulating the narrowband signal which conveys a channel of interest, picking the channel of interest out of a specific time slot if TDMA communication schemes are employed, and performing any repackaging, modulation, combination, or other function needed to pass the information obtained from the channel of interest toward its ultimate destination.

Different nodes process different channels from the total network allocation. All channels get used, but the usage is spread over many different nodes. From time to time, the mix of channels processed at the nodes changes. When nodes reside in satellites orbiting the earth in moving orbits, the mix of channels processed at the nodes can change on a minute by minute basis. Accordingly, network nodes are typically configured to process a greater number of channels than they actually need to process at any given instant. This type of configuration leads to inefficiencies which have particularly serious consequences when the nodes are located in earth-orbiting satellites.

Conventional communication network nodes may be arranged in either of two different configurations. When the mix of channels processed at each node changes slowly, such as on a month by month basis, and when the nodes are located where they may be accessed by service personnel, the minimum hardware needed to meet the maximum instantaneous demand may be allocated to the node. This minimum hardware is usually manually tuned to process those channels which might possibly be used at each node. This technique is undesirable because it causes different hardware configurations to be located at different nodes, is labor intensive, and provides little excess capacity in case of failures.

When the mix of channels processed at each node changes quickly, or when the nodes are located where they cannot be easily accessed by service personnel, the nodes are typically provisioned with significantly more hardware than is required to process all channels being by the node used at any given instant. This is a conventional technique for nodes located in moving-orbit satellites. Unfortunately, the inclusion of more hardware than is absolutely necessary is highly undesirable in satellites. Excess hardware causes increased weight, increased power consumption, and reduced reliability, all of which can lead to tremendous increases in expenses. While power management schemes may be employed to de-energize hardware not being used at any given instant, such schemes are typically applied at system

2 levels rather than assembly levels to prevent the power management hardware from causing more problems than it solves.

Accordingly, a need exists for a communications network node which can process any channel that may be allocated to the network using a hardware-efficient architecture.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

Figure 1:
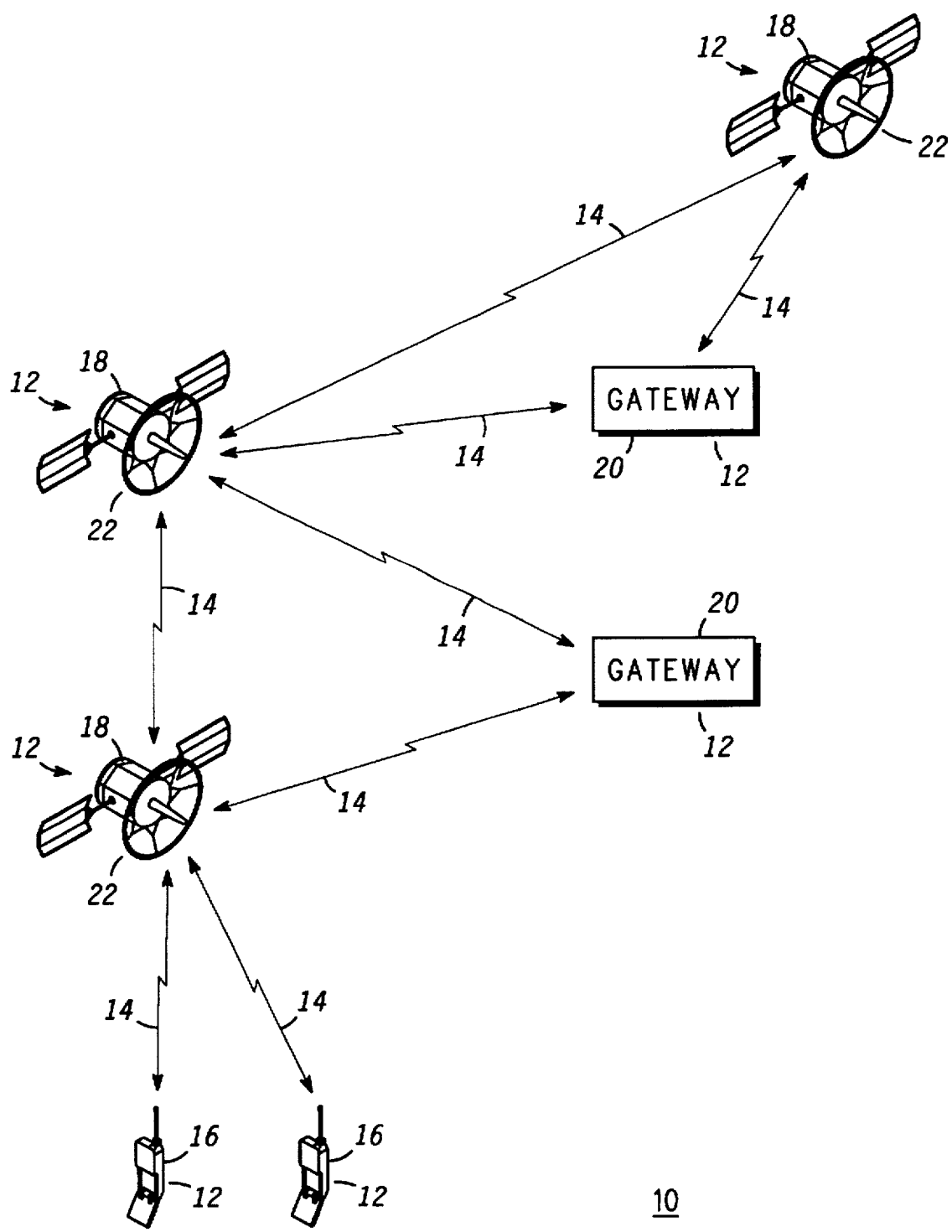
FIG. 1 shows a layout diagram of a communications network environment in which a preferred embodiment of the present invention may be used.

FIG. 1 shows a layout diagram of an environment within which a communications network 10 may be implemented. Network 10 includes numerous nodes 12 which couple together through RF communication links 14. FIG. 1 depicts nodes 12 as being configured as handsets 16, satellites 18, and gateways 20. Through RF communication links 14, subscriber units 16 satellites 18 may communicate with other satellites 18, handsets 16, and gateways 20. The below-discussed features of a preferred embodiment of the present invention may be practiced at any node 12 of network 10 or of other communications networks. However, such features may be particularly beneficial if incorporated in satellites 18.

Satellites 18 may reside in low earth orbits. In such orbits, satellites 18 move at high speed relative to any given point on the surface of the earth. Subscriber units 16 and gateways 20 may reside proximate the surface of the earth where they are virtually stationary relative to satellites 18.

Satellites 18 are desirably configured as cellular telecommunications base stations and are referred to as base station nodes 18 and simply nodes 18 below. Base station nodes 18 project cells (not shown) toward the surface of the earth. Communications with subscriber units 16 are conducted in accordance with channels assigned for use in the cells at any given instant. Due to the high speed movement of nodes 18, the channel assignments may change from minute to minute. Communications conducted with subscriber units 16 and other communications, such as signaling and trunked communications, are received at nodes 18 via communication links 14 and passed onward within network 10 toward the ultimate destinations for the communications. Such communications may be received from subscriber units 16, other nodes 18, or gateways 20, at any of various antennas 22 of nodes 18.

Generally, antennas 22 provide wideband signals each of which can convey numerous channels of information. In the preferred embodiment, the information is conveyed digitally using data packets. The channels of information are combined together in the wideband signals using FDMA/TDMA techniques. However, the use of digital communication or any specific multiple access technique is not a requirement of the present invention. While the wideband signals may convey numerous channels of information, it would be an extremely rare circumstance for all channels combined together in a wideband signal to be active and convey information at any given instant.

Nodes 18 receive these wideband signals at an incoming portion of a link 14. Nodes 18 then decompose the wideband signals into narrowband signals which convey individual channels. Those individual channels which are active at any given instant are demodulated to obtain communicated information, and the communicated information is routed to appropriate outgoing portions of links 14. Appropriate outgoing links 14 are the ones which further movement of the information toward the information's ultimate destinations. Node 18 then re-modulates the information for each outgoing link 14 and combines the re-modulated information with other modulated packets flowing outward over the outgoing link to form a wideband signal. The wideband signal is then transmitted over the outgoing link.

In accordance with the preferred embodiments of the present invention, node 18 provides extensive receiving and decomposing functions to accommodate the numerous diverse channels and the various received wideband signals which network 10 uses. Node 18 also incorporates switching functions along with limited demodulation and modulation (i.e. modem) functions. The switching functions provide extensive interconnectivity between decomposing functions and modem functions. Consequently, each node 18 need not incorporate modem functionality sufficient to accommodate all channels used in network 10 when only a fraction of the channels are active for any single node 18 at any given instant.

Figure 2:
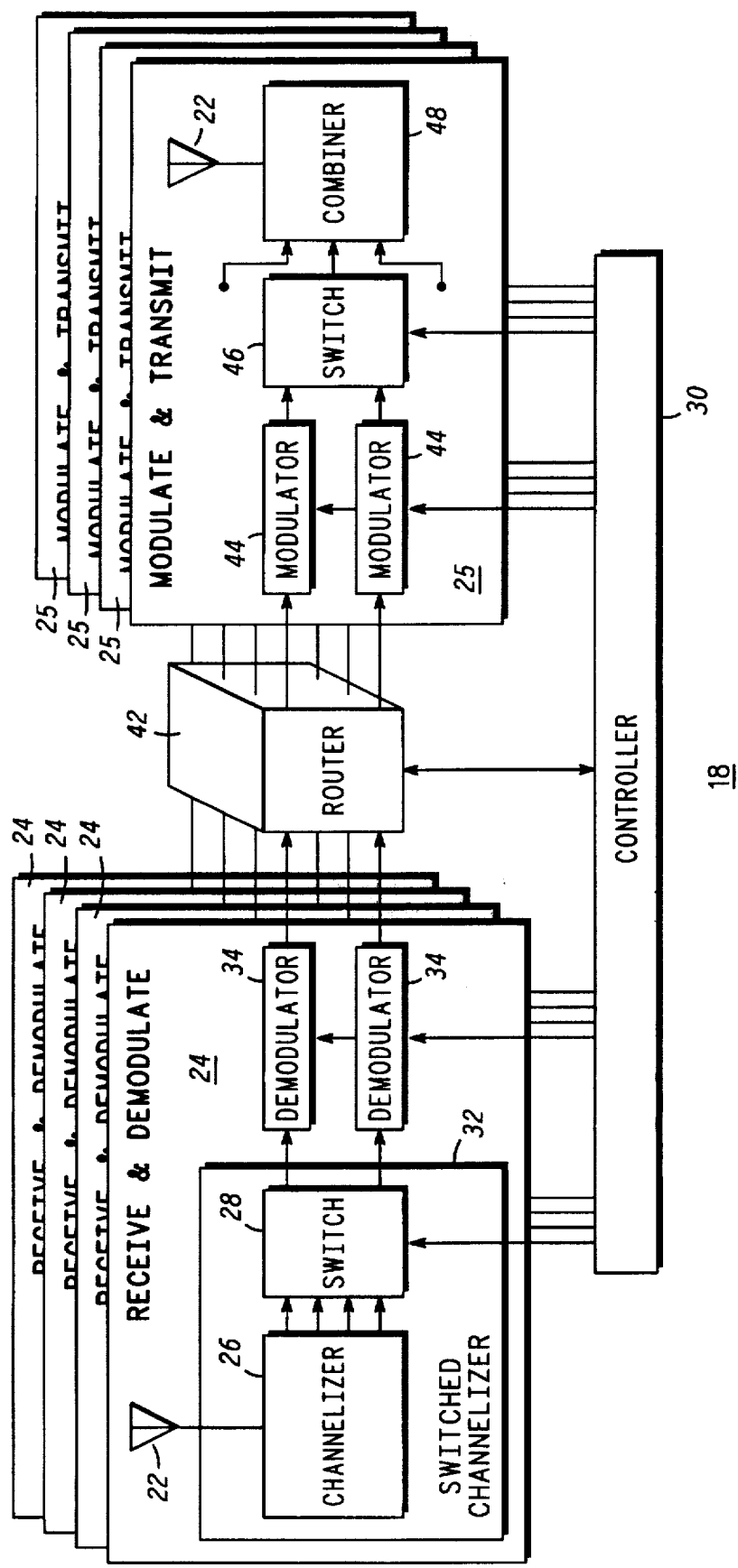
FIG. 2 shows a block diagram of a network node.

FIG. 2 shows a simplified block diagram of a communications network node, such as node 18. Node 18 includes any number of receive and demodulate sections 24 and any number of modulate and transmit sections 25. Each receive and demodulate section 24 is driven by one or more antennas 22. An antenna 22 provides a wideband signal which is fed to a channelizer 26.

Channelizer 26 is a conventional circuit known to those skilled in the art. Channelizer 26 decomposes the wideband signal into its constituent channels. Channelizer 26 may operate on RF or baseband, analog or digital signals. The wideband signal carries different channels using different frequency bands, different time slots, different spread spectrum coding, or a combination of any two or more of these techniques. Accordingly, channelizer 26 translates the wideband signal into a plurality of narrowband signals, where each narrowband signal conveys one of the channels conveyed by the wideband signal.

A switch 28 has an input port for each narrowband signal. In the preferred embodiments of the present invention, switch 28 has fewer output ports than it has input ports. Switch 28 is configured so that a selected one of the narrowband signals appearing at the input ports is provided for each of the output ports. In the preferred embodiments, the selected signals are specified by a controller 30 which couples to a selection input of switch 28.

A wide range of switching architectures known to those skilled in the art may be used to implement switch 28. The precise structure of switch 28 will depend in part upon the nature of the narrowband signals supplied at the input ports to switch 28. FIG. 2 illustrates the narrowband signals using four separate connectors extending from outputs of channelizer 26 to corresponding input ports of switch 28. Those skilled in the art will appreciate that a space switching fabric may be useful in this architecture. However, nothing prevents the narrowband signals from being provided in series over a common communication path between channelizer 26 and switch 28. In this situation, a time switching fabric may be useful for switch 28. In other embodiments, channelizer 26 may be implemented, at least in part, using a digital signal processor. In this embodiment, switch 28 and channelizer 26 may simply share a common buffer memory. FIG. 2 shows only four narrowband signals for convenience. Typical channelizers often produce many more narrowband signals than this number, but the present invention applies to any number of narrowband signals, whether that number is greater or less than four.

Channelizer 26 and switch 28 together form a switched channelizer 32. Switched channelizer 32 represents a building block or module which may be used in numerous instances within node 18. The use of switched channelizer 32 as a building block is discussed below in connection with FIG. 4.

The output ports of switch 28 and of switched channelizer 32 couple to inputs of demodulators 34. Demodulators 34 desirably incorporate conventional designs to extract communicated information from the narrowband signals. Demodulators 34 may also couple to controller 30 so that controller 30 may provide power management for demodulators 34. In the preferred embodiment, fewer demodulators 34 are included in a receive and demodulate section 24 than the receive and demodulate section 24 has of narrowband signals.

Figure 3:
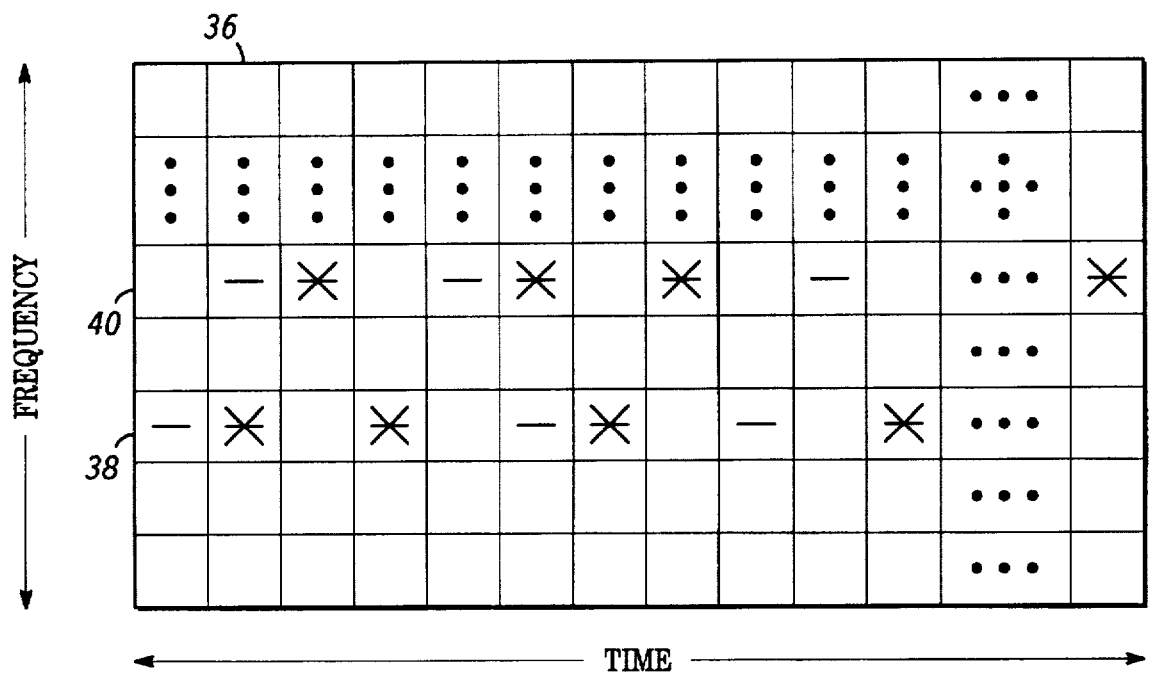
FIG. 3 shows a table of an exemplary FDMA/TDMA communication scheme.

FIG. 3 shows a table 36 depicting an exemplary FDMA/TDMA communication scheme. Rows in FIG. 3 indicate frequency bands for individual channels, columns indicate time slots for individual channels, and the cells where rows and columns intersect represent the individual channels. An entire frequency spectrum allocated to network 10 (see FIG. 1) may be divided into many frequency bands and time slots to yield a vast number of individual channels. Only a portion of this vast number of individual channels is allocated to any single node 18, but this portion changes over time. For convenience, FIG. 3 depicts channels allocated to a node 18 with a "–" mark. The allocated channels represents the maximum capacity of the node 18, and this maximum capacity is determined in response to a network-wide analysis of channel resources to be allocated to node 18 and other nodes 18. Referring back to FIG. 2, the number of demodulators 34 included in node 18 is based upon this maximum capacity for any future instant. This number is significantly less than the total number of frequency bands or individual channels allocated to network 10.

At any given instant, the actual number of active channels in use at a node 18 is usually less than the maximum capacity. FIG. 3 depicts active channels, which are in use, with an "X" mark. Referring to FIGS. 2 and 3, a single demodulator 34 may be used efficiently by being quickly switched between frequency bands 38 and 40 during different time slots. In other words, a greater number of demodulators 34 need not remain idle when frequency bands to which they may be assigned experience inactive time slots. Rather, a lesser number of demodulators 34 may get switched between frequency bands in different time slots to process active channels. By switching a demodulator 34 between different frequency bands, channelizer 26 may maintain constant tuning rather than suffer settling time delays associated with re-tuning. Moreover, channelizer 26 may be constructed using a simple constantly tuned architecture rather than a complex tunable architecture.

Accordingly, the ability to switch demodulators 34 to track changes in channel allocations to node 18 allows node 18 to incorporate fewer demodulators 34 than it otherwise would. Moreover, the ability to quickly switch demodulators 34 between time slots allows node 18 to incorporate even fewer demodulators 34 than it otherwise would. Furthermore, when allocated channels are inactive, power management processes provided by controller 30 may selectively energize and de-energize demodulators 34 so that only a minimum number of demodulators 34 are energized at any given instant. Entire demodulator systems may remain de-energized for longer periods of time to further reduce power consumption.

Referring back to FIG. 2, outputs from demodulators 34 couple to a node router section 42. Router section 42 routes packets as required to ensure re-transmission away from node 18 over a link 14 (see FIG. 1) which will cause the communicated information to move closer to its intended destination. Other paths into and out of the router may be included to allow the information to be provided to other equipment. Modulate and transmit section 25 provides reverse or complementary functions to those provided by receive and demodulate section 24. Modulators 44 of modulate and transmit section 25 couple to router section 42 to accept and modulate routed packets. Each modulated packet forms a narrowband signal, and these narrowband signals are provided to input ports of a switch 46. An output port of switch 46 couples to an input of a channelizer or combiner 48, and an output of combiner 48 provides a wideband signal that drives an antenna 22. Combiner 48 may include a plurality of inputs some of which are driven by other modulate and transmit sections 25. Controller 30 may couple to router 42 to control routing, modulators 44 to manage power consumption, and switch 46 to specify the channels which are to be combined in combiner 48. In a preferred embodiment of the present invention, switch 46 and combiner 48 comprise a transmit switched channelizer that performs substantially the opposite function of switched channelizer 32 of demodulate section 24.

While FIG. 2 shows separate antennas 22 associated with receive and demodulate section 24 and with modulate and transmit section 25, a common antenna 22 may also be used. Likewise modulators 44 and demodulators 34 need not be entirely separate items but may be combined into common modems. Further, while FIG. 2 depicts controller 30 as performing power management functions only for demodulators 34 and modulators 44, power management may be extended to switches 28 and 46 and to channelizers 26 and combiners 48.

Figure 4:
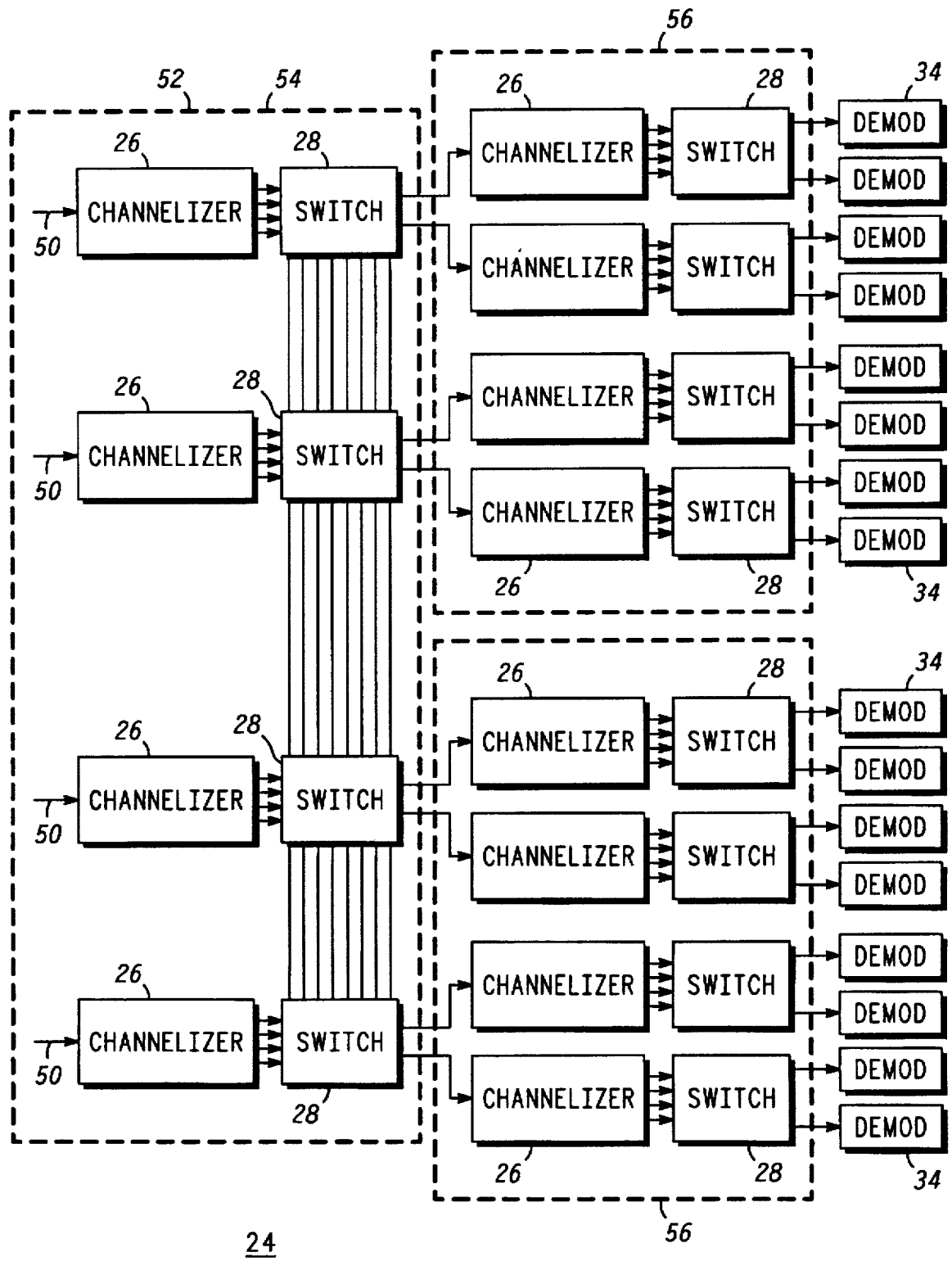
FIG. 4 shows a block diagram of a receive and demodulate section of the network node.

FIG. 2 illustrates a simplified block diagram of a node 18 to show certain features of the preferred embodiment of the present invention. FIG. 4 shows a more detailed block diagram of a more practical and complex receive and demodulate section 24 to show other features of the preferred embodiment. For clarity, FIG. 4 omits signal communication paths between controller 30 and switches 28 and between controller 30 and demodulators 34. However, switches 28 and demodulators 34 in FIG. 4 nevertheless desirably couple to controller 30, as illustrated in FIG. 2, to specify channels selected at switches 28 and to selectively energize demodulators 34.

Referring to FIG. 4, receive and demodulate section 24 includes numerous switched channelizer 32 building blocks coupled together in a serial/parallel architecture. Different wideband signals are provided at inputs 50 to a wideband tier 52 of switched channelizers 32. The different wideband signals may be provided from different antennas 22 (see FIGS. 1–2). Switches 28 in wideband tier 52 couple together so that any narrowband signal provided by any channelizer 26 in wideband tier 52 may be routed to any output port of any switch 28 in tier 52. Due to the interconnections between switches 28 in wideband tier 52, tier 52 forms a single interconnected switched channelizer group 54.

Figure 5:
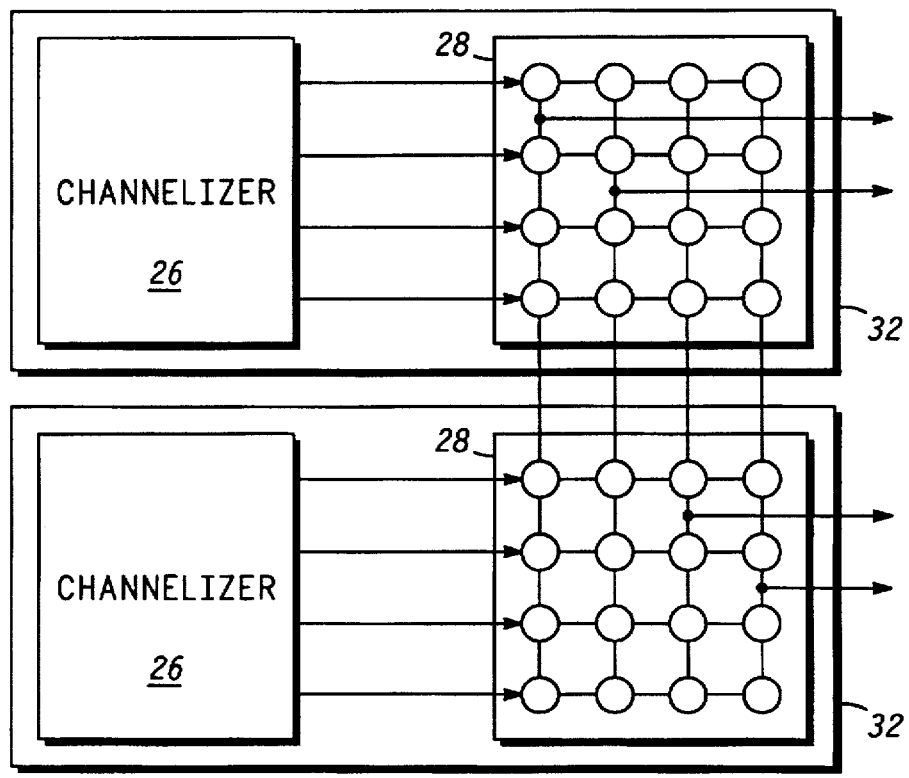
FIG. 5 shows a block diagram of an interconnecting switching arrangement.

FIG. 5 shows a block diagram of an interconnected switched channelizer group 54 which incorporates two switched channelizers 32. FIG. 5 illustrates a space switch arrangement for switches 28, where rows correspond to input ports, columns correspond to output ports, and the intersections between rows and columns represent individual switch elements. As illustrated in FIG. 5, an interconnection is provided between switches 28 for each output port. Any input of either switch 28 can be routed to the output of the other switch 28.

Referring back to FIG. 4, wideband tier 52 of switched channelizers 32 drives a narrowband tier 56 of switched channelizers 32 to form a two stage switch. In other words, output ports of switches 28 in wideband tier 52 couple to inputs of channelizers 26 in narrowband tier 56. Desirably, the number of switched channelizers 32 in narrowband tier 56 is less than the number of narrowband signals provided by channelizers 26 in wideband tier 52. Each switched channelizer 26 in narrowband tier 56 drives one or more demodulators 34.

Those skilled in the art will appreciate that the terms wideband and narrowband are relative terms. Accordingly, the narrowband signals produced by wideband tier 52 serve as wideband signals for narrowband tier 56 and have a wider bandwidth than the narrowband signals produced by narrowband tier 56. The narrowband signals produced by wideband tier 52 may be viewed as intermediate bandwidth signals, or the wideband signals received at inputs 50 of channelizers 26 may be viewed as super-wideband signals. In a digital implementation, wideband tier 52 may be implemented using high speed components which provide FFT processes to decompose the wideband signals received at inputs 50 into intermediate bandwidth frequency bins. Narrowband tier 56 may be implemented using lower speed components which consume less power and which provide FFT processes to further decompose the intermediate bandwidth frequency bins into narrowband signals which convey one channel at a time.

FIG. 4 depicts narrowband tier 56 as being arranged into two interconnected switched channelizer groups 54. No coupling is provided between switches 28 in the two groups 54 within narrowband tier 56 to reduce switch complexity. Nevertheless, any channel conveyed by any super-wideband signal received at an input 50 may still be routed to any demodulator 34 using, as a minimum, switching in wideband tier 52.

Although not shown, modulate and transmit section 25 (see FIG. 2), may have a complementary architecture to that depicted in FIG. 4 for receive and demodulate section 24.

In summary, the present invention provides an improved communications network node with a switched channelizer architecture. The communications network node incorporates a switched channelizer that can be combined in parallel and/or in series with other similar switched channelizers to process any number of channels obtained from any number of received wideband signals. The communications network node provides modem functions in proportion to cell traffic rather than spectrum capacity. The flexibility which results from the switched channelizers allows modem resources to be allocated to received channels as needed from instant to instant. Accordingly, modem resources are reduced. Power consumption management is improved since active channels can be routed so that entire modulator systems may be de-energized.

The present invention has been described above with reference to preferred embodiments. However, those skilled in the art will recognize that changes and modifications may be made in these preferred embodiments without departing from the scope of the present invention. For example, the communications node described need not be located in a satellite but may be included in a terrestrial base station, switching office, or the like. Such changes and modifications which are obvious to those skilled in the art are intended to be included within the scope of the present invention.

What is claimed is:

1. A communications network node comprising:
   a first channelizer configured to decompose a first wideband signal into a first plurality of narrowband signals; and
   a first switch having at least one input port coupled to said first channelizer and having an output port, said first switch being configured to provide a selected one of said narrowband signals of said first plurality at said output port thereof;
   a second channelizer configured to decompose a second wideband signal into a second plurality of narrowband signals;
   a second switch having at least one input port coupled to said second channelizer and having an output port, said second switch being configured to provide a selected one of said second narrowband signals at said output port thereof; and
   means, coupled to said first and second switches, for selecting ones of said first and second pluralities of narrowband signals to route to said first and second switch outputs, respectively,
   wherein said first switch couples to said second switch so that a selected one of said first narrowband signals can be routed to said second switch output.

2. A communications network node as claimed in claim 1 wherein said output port of the first switch is one of a plurality of first switch outputs, and wherein said output port of the second switch is one of a plurality of second switch outputs, and said communications network node additionally comprises:
   a first plurality of demodulators coupled to said plurality of first switch outputs;
   a second plurality of demodulators coupled to said plurality of second switch outputs; and
   power control means, coupled to each demodulator of said first and second plurality for selectively energizing each demodulator of said first and second plurality.

3. A communications network node as claimed in claim 1 wherein:
   said first channelizer and said first switch together form a first switched channelizer;
   said second channelizer and said second switch together form a second switched channelizer;
   said first and second switched channelizers form a first interconnected switched channelizer group; and
   said communication node additionally comprises a second interconnected switched channelizer group coupled to said selecting means.

4. A communications network node as claimed in claim 3 wherein:
   said first narrowband signals being switched in said first interconnected switched channelizer group are not routed to said second interconnected switched channelizer group; and
   said second narrowband signals being switched in said second interconnected switched channelizer group are not routed to said first interconnected switched channelizer group.

5. A communications network node as claimed in claim 1 wherein:
   said network node forms a cellular telecommunications base station;
   said network node includes a first antenna which generates said first wideband signal and couples to said first channelizer; and
   said network node includes a second antenna which generates said second wideband signal and couples to said second channelizer.

6. A communications network node comprising:
   a first channelizer configured to decompose a first wideband signal into a first plurality of narrowband signals; and
   a first switch having at least one input port coupled to said first channelizer and having an output port, said first switch being configured to provide a selected one of said narrowband signals of said first plurality at said output port thereof;
   a second channelizer configured to decompose said selected one of said first narrowband signals into a second plurality of narrowband signals, wherein each of said second plurality of narrowband signals has a narrower bandwidth than said selected one of said first narrowband signals; and
   a second switch having at least one input port coupled to said second channelizer and having an output port, said second switch being configured to provide a selected one of said second narrowband signals at said output port thereof.

7. A communications network node as claimed in claim 6 additionally comprising:
   a third channelizer configured to decompose a third wideband signal into a third plurality of narrowband signals;
   a third switch having at least one input port coupled to said third channelizer and having an output port, said third switch being configured to provide a selected one of said third narrowband signals at said output port thereof; and
   means, coupled to said first and third switches, for selecting ones of said first and third pluralities of narrowband signals to route to said first and third switch outputs, respectively.

8. A communications network node as claimed in claim 7 wherein said first switch couples to said third switch so that a selected one of said first narrowband signals can be routed to said third switch output.

9. A method of routing communication signals within a communications network node comprising the steps of:
   a) decomposing a wideband signal into a first plurality of narrowband signals; and
   b) switching, with a first switch, a selected one of said first plurality of narrowband signals to a first input of a first demodulator,
   c) decomposing a second wideband signal into a second plurality of narrowband signals;

d) switching, with a second switch, a selected one of said second plurality of narrowband signals to a second demodulator; and e) switching, with said first and second switches, said selected one of said first plurality of narrowband signals to said second demodulator, said first switch coupling to said second switch so that a selected one of said first narrowband signals can be routed to said second switch output.

10. A method as claimed in claim 9 additionally comprising the step of selectively energizing said first and second demodulators.

11. A method of routing communication signals within a communications network node comprising the steps of:

a) decomposing a wideband signal into a plurality of narrowband signals; and b) switching a selected one of said plurality of narrowband signals to an input of a demodulator, wherein said step a) decomposes a first wideband signal into said plurality of narrowband signals, said step b) switches said selected one of said narrowband signals to said demodulator, and said method additionally comprises the steps of:

c) decomposing a super-wideband signal into a plurality of wideband signals, wherein each of said plurality of wideband signals has a narrower bandwidth than said super-wideband signal; and d) switching a selected one of said plurality of wideband signals to serve as said first wideband signal.

12. A communications network node comprising:

a first channelizer configured to decompose a wideband signal into a plurality of intermediate bandwidth signals;

a first switch having an input port adapted to receive said plurality of intermediate bandwidth signals and having first and second output ports, said first switch being configured to provide first and second selected ones of said intermediate bandwidth signals at said first and second output ports, respectively, of said first switch;

a second channelizer having an input adapted to decompose said first selected one of said intermediate bandwidth signals into a plurality of first narrowband signals;

a second switch having an input port adapted to receive said plurality of first narrowband signals and having first and second output ports, said second switch being configured to provide first and second selected ones of said first narrowband signals at said first and second output ports, respectively, of said second switch;

a third channelizer having an input adapted to decompose said second selected one of said intermediate bandwidth signals into a plurality of second narrowband signals;

a third switch having an input port adapted to receive said plurality of second narrowband signals and having first and second output ports, said third switch being configured to provide first and second selected ones of said second narrowband signals at said first and second output ports, respectively, of said third switch;

first and second demodulators coupled to said first and second outputs, respectively, of said second switch; and third and fourth demodulators coupled to said first and second outputs, respectively, of said third switch.

13. A communications network node as claimed in claim 12 wherein said second switch couples to said third switch so that a selected one of said first narrowband signals can be routed to said third switch outputs.

14. A communications network node as claimed in claim 12 additionally comprising power control means, coupled to said third and fourth demodulators, for selectively energizing said third and fourth demodulators.

15. A switched channelizer comprising:

a first switch portion having a plurality of first input ports, each first input port for receiving a first narrowband signal of a first plurality of narrowband signals of a same frequency, said first switch portion having at least one output port for providing selected ones of said first narrowband signals;

a first channelizer portion configured to recompose said selected ones of said first narrowband signals provided by said first switch portion into a first wideband signal a second switch portion having a plurality of second input ports, each second input port for receiving a second narrowband signal of a second plurality of narrowband signals of a same frequency, said second switch portion having at least one output port for providing selected ones of said second narrowband signals; and a second channelizer portion configured to recompose said selected ones of said second narrowband signals provided by said second switch portion into a second wideband signal, one of said second input ports being coupled to said an output port of said first channelizer, said first wideband signal being one of said narrowband signals of said second plurality provided to said one second input port, said narrowband signals of said first plurality having a narrower bandwidth than said narrowband signals of said second plurality.

* * * * *